United States Patent
Warkotsch

(12) 
(10) Patent No.: US 6,688,173 B1
(45) Date of Patent: Feb. 10, 2004

(54) BALANCING DEVICE

(75) Inventor: Dirk Warkotsch, Burgwedel (DE)

(73) Assignee: Horst Warkotsch, Burgwedel (DE)

( * ) Notice: Subject to any disclaimer, the term of this patent is extended or adjusted under 35 U.S.C. 154(b) by 55 days.

(21) Appl. No.: 10/018,118

(22) PCT Filed: Jun. 14, 2000

(86) PCT No.: PCT/EP00/05448

§ 371 (c)(1),
(2), (4) Date: Dec. 14, 2001

(87) PCT Pub. No.: WO00/77485

PCT Pub. Date: Dec. 21, 2000

(30) Foreign Application Priority Data

Jun. 15, 1999 (DE) .......................... 199 27 307

(51) Int. Cl.$^7$ ............................................... G01M 1/16
(52) U.S. Cl. ....................................................... 73/462
(58) Field of Search .......................... 73/462, 460, 474

(56) References Cited

U.S. PATENT DOCUMENTS

| | | | | |
|---|---|---|---|---|
| 2,201,982 A | | 5/1940 | Bazarek ........................ | 157/19 |
| 2,349,552 A | | 5/1944 | Holmes ........................ | 73/459 |
| 3,922,922 A | * | 12/1975 | Eickhart ...................... | 73/462 |
| 5,419,193 A | * | 5/1995 | Borner et al. ................. | 73/462 |
| 5,603,148 A | | 2/1997 | Hjorth-Hansen ............ | 29/33 R |

FOREIGN PATENT DOCUMENTS

| | | |
|---|---|---|
| DE | 2321437 | 11/1974 |
| DE | 2928945 | 2/1980 |
| DE | 19611574 | 5/1997 |
| DE | 69315722 | 6/1998 |
| EP | 0557240 | 8/1993 |

OTHER PUBLICATIONS

Hofmann report 712—Teilautomatische Raderauswuchtmaschine EAV–16 RA 4, 4 Seiten, Impressum 96 226 200 198 (enclosed).

Ecomont system, Prospekt der Hofmann Werkstatt–Technik GmbH 64311 Pfungstadt, 4 Seiten, Impressum 9402424, 07.95 (enclosed).

Hofmann report 20—Reinfenmontage und Fullanlage RMS–K, 4. Seiten, Impressum 9631 757 09–74 (enclosed).

* cited by examiner

*Primary Examiner*—Hezron Williams
*Assistant Examiner*—Tamiko Bellamy
(74) *Attorney, Agent, or Firm*—Collard & Roe, P.C.

(57) ABSTRACT

The invention relates to a balancing device consisting of a balancing machine provided with a shaft for clamping a wheel, a supporting frame and a cover which is placed on top of the supporting flame. The balancing machine can be pivoted 90° in relation to the supporting frame, moving from a horizontal measuring position to an upper position or centering position. In order to facilitate handling when the wheel is placed on the shaft of the balancing machine, said balancing machine is provided with a height adjustment device which enables the balancing machine to be lowered into the supporting frame and moved out of the centering position, whereby the outer end of the shaft does not protrude above the cover.

16 Claims, 12 Drawing Sheets

BALANCING DEVICE

CROSS REFERENCE TO RELATED APPLICATIONS

Figure 1:
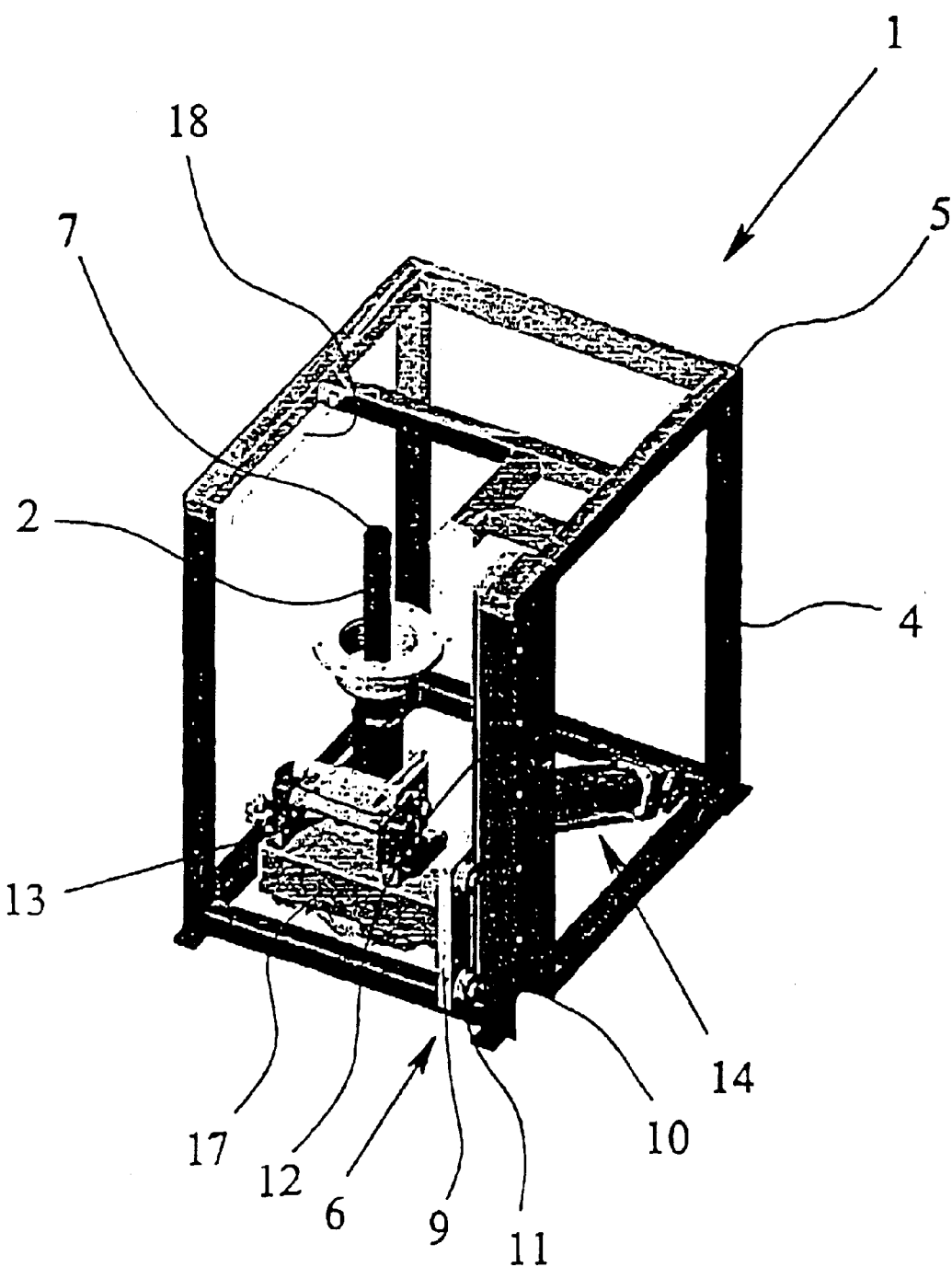

Applicant claims priority under 35 U.S.C. §119 of German Application No. 199 27 307.3 filed Jun. 15, 1999. Applicant also claims priority under 35 U.S.C. 365 of PCT/EP00/05448 filed Jun. 14, 2000. The international application under PCT article 21(2) was not published in English.

The invention relates to a balancing device including a balancer provided with a shaft for clamping a wheel and a support structure with a bearing surface. The invention further relates to a balancing and inflation station having a balancing device of the type indicated and tire-changing apparatus with a bead breaking mechanism, a tire-changing mechanism and a balancing and inflation station of the type indicated.

The invention relates to a balancing device in accordance with the preamble of claim 1. The invention further relates to a balancing and inflation station having a balancing device of the type indicated and tire-changing apparatus with a bead breaking mechanism, a tire-changing mechanism and a balancing and inflation station of the type indicated.

A balancing device as indicated above is already known from EP 0 557 240 B1. The known balancing device represents an improvement over those devices in which the balancer cannot be pivoted and is only horizontally disposed, in that the occurrence of centering errors while the wheel is being clamped to the shaft of the balancer are precluded.

In practice, however, the known balancing device presents a number of disadvantages that can be attributed to the fact that, in the vertical centering position, the upper extremity of the balancer shaft projects relatively far over the bearing surface of the supporting structure. In order to mount a wheel on the balancer when it is pivoted into the centering position, the operator must lift the wheel relatively high, an operation associated with some difficulty, especially if the operator is not tall and the wheel rim is heavy.

Balancing devices of the type indicated above may also constitute a part of a balancing and inflation station and tire-changing equipment. A tire-changing device known in the art has the following functional units arranged sequentially:

1. a wheel elevator
2. a storage bench for multiple wheels
3. a bead breaker with turntable
4. a tire-changing device
5. an inflation station with inflation bench
6. a wheel-rotating system
7. a wheel hoist and
8. a balancing device.

With the known tire-changing equipment, the tire is changed in such a manner that the operator first drives the vehicle to the work area, where the vehicle is lifted; the wheels are then removed from the vehicle and are placed on the wheel elevator, which automatically lifts the wheels onto the storage bench. Once on the storage bench, the wheels are moved along the bench by tilting and rolling. A second operator changes the tire after releasing the rim bead with the bead breaker. To this end, the wheel is simply rolled from the storage bench to the bead breaker and then tipped onto the tire-changing machine. The wheel is then transported to the inflation station and inflated until a prescribed overpressure is reached. The tire is then deflated to achieve the correct final pressure. After inflation, the wheel is removed from the inflation bench by a further operator. To this end, the wheel is tilted onto the wheel hoist by a wheel rotating system situated adjacent to the inflation station. Here, the wheel is raised so that it can be clamped to the shaft of the balancer, which faces the inflation station, and the wheel is balanced thereupon.

Operation of the tire-changing equipment described above, in which a multiplicity of devices are combined, requires quite a large expenditure of effort, and, above all, the device itself takes up a great deal of space. The known tire-changing device is not suitable for use in smaller workshops.

The object of the invention is therefore to provide a balancing device of the type described in the introduction, which simplifies handling while a wheel is being clamped. If the balancing device is used in conjunction with a balancing and inflation station or tire-changing equipment, the object of the invention is also to provide a balancing and inflation station with the simplest and most compact design possible.

The objects described above with respect to a balancing device of the kind described in the introduction are essentially met according to the invention, in that the balancer is provided with a height adjustment mechanism so that the balancer can be lowered from the centering position into the supporting structure to the extent that the distal extremity of the shaft does not project above the bearing surface. The lowering capability of the balancer provided in accordance with the invention presents a number of significant advantages. First, it allows the balancer to be lowered completely, so that a wheel can be placed on the bearing surface or bench of the balancing device and then repositioned on the bearing surface or bench to assure the central opening of the wheel or rim is precisely centered on the shaft of the balancer. Appropriate centering means or devices may be provided on the bearing surface for this purpose. When the wheel has been positioned accordingly on the bearing surface of the balancing device, the balancer may be elevated from its lowered or retracted position, this operation causes the shaft to project through the rim opening and the wheel is consequently lifted. In any case, the wheel no longer has to be raised manually to the height of the balancer's centering position.

The configuration according to the invention presents the further significant advantage that it is possible to integrate the balancing device in a combination balancing and inflation station. Besides the balancing device of the kind described, this station is also furnished with equipment for the supply of pressurized air and an inflation bench, wherein the bearing surface constitutes the inflation bench or the inflation bench serves as the bearing surface. The station according to the invention combines two distinct apparatuses of the known art, that is to say the inflation station and the balancing device, while rendering a wheel rotating system and a wheel hoist unnecessary, since inflation and balancing are performed at one and the same station. Thus, the space requirement of the balancing and inflation station and tire-changing equipment provided with such a station is also considerably reduced.

According to the invention, the tire of a wheel is changed in such a manner that when the old tire has been replaced by a new tire, the wheel is transported to the balancing and inflation station, and the wheel is placed on the inflation bench of the balancing and inflation station with the rim well facing downwards. The tire is inflated with air at a preset pressure. The wheel on the inflation bench is then clamped to the balancer shaft of the balancing and inflation station. For this purpose, the shaft is moved upwards with the balancer and into the centering position out of the balancing and inflation station. The balancer is then pivoted 90° into the horizontal measuring position together with the wheel that is clamped to the shaft for the performance of the balancing measurement cycle. As can be seen, this method of inflation and balancing a wheel according to the invention differs markedly from the method known in the art.

The balancing device according to the invention is preferably furnished with at least one carriage guided by a guide, opposite which the balancer is pivotably arranged to allow rotation from the centering position to the measuring position and vice versa. In order to achieve uniform height adjustment, it may also be provided that the height adjustment mechanism is furnished with one guide having a carriage on each of the opposing sides, and the balancer is disposed between the carriages. The carriages are preferably connected to each other by means of a cross member, on which the balancer is pivotably disposed. Height adjustment of the balancer may be assured in all cases by electrical, pneumatic or hydraulic adjusting drives, such as electric motors as well as pneumatic or hydraulic cams.

In order to achieve a defined motion when pivoting the balancer, and to delimit the rotational travel, a preferred embodiment of the invention provides for pivoting to be effected by means of a cam plate and a spring-loaded pivot pin acting on the cam plate. The cam plate is further furnished with recesses at the extreme positions to engage with the pivot pin. In addition, limit stops are provided that prevent rotational travel significantly beyond the respective extreme position.

Additionally, in a preferred embodiment of the invention, the pivotable balancer is provided with braking means to slow the pivoting motion. Such braking means may have the form of counteracting cams.

In a particularly preferred configuration of the present invention, the height adjustment mechanism is provided with an articulated linkage that is pivotably disposed in the supporting structure and is connected at one end to the balancer and at the other end to the adjustment drive. The articulated linkage is constructed in such a manner that, upon actuation by means of the adjustment drive, it assures both elevating and pivoting motion of the balancer. A special angle lever and at least one further lever connected with the angle lever are provided specifically for this purpose.

The invention further relates to a balancing device having a balancer that is equipped with a shaft for clamping a wheel.

Balancing devices of the kind described above have long been known in the art. As a rule, the balancer in the known balancing devices is disposed together with the measurement electronics in a housing of the balancing device. The shaft of the balancer, to which the wheel is to be clamped for balancing, usually protrudes through a side wall of the housing of the balancing device. As part of the balancing operation, the wheel is placed on the horizontally extended shaft of the balancer.

However, a balancing device is also known, for example from EP 0 557 240 B1 cited in the introduction, in which the balancer is arranged pivotably in the balancing device, wherein the balancer can be pivoted from a top, centering position, in which the shaft of the balancer extends upwards, to the horizontal measuring position, in which the balancer shaft extends horizontally. The horizontal centering of the wheel to be balanced has the considerable advantage that the incidence of unbalanced masses as the wheel is being clamped to the shaft of the balancer, and the measurement errors resulting therefrom are minimized.

After the wheel has been clamped to the shaft of the balancer, the measurement cycle is performed. The balancer detects the magnitude and position of unbalanced masses. Balancer weights are applied to the rim in accordance with the unbalanced masses detected. The attachment of balancer weights inside the rim well of the wheel is usually difficult when using the known balancing devices: the operator has very little room in which to inspect the rim well when attaching the adhesive weights because of the wheel's position parallel to the housing. The severe space limitations, and the fact that it is difficult and often impossible to see inside the rim well, may lead to incorrect positioning of the balancer weight in the rim well.

The object of the present invention is therefore also to provide a balancing device of the kind previously described, in which the adhesive balancer weights can be easily attached to the rim well in the correct position.

The object stated above is essentially met in accordance with the invention in that the balancer is pivotably arranged on a retaining arm of a supporting member in such manner that balancer may be pivoted 90° downward from the horizontal measuring position, to a bottom fitting position. For the first time, the arrangement according to the invention allows the balancer weights to be attached inside the rim well with the wheel disposed horizontally. In the balancer's bottom position, in which the shaft extends directly downwards, the rim well is now upwardly open, so that it is possible to view the rim well without any difficulty, and to attach the adhesive weight to the balance point that is clearly visible from the exterior.

In all cases, it is possible to arrange the longitudinal axis of the retaining arm coaxially or parallelly with the rotational axis of the shaft. In this case, the balancer is pivoted downwardly to the front, so that when in the fitting position the wheel being balanced is at least partly under the retaining arm. At least a part of the rim well of the wheel can still be seen from above without difficulty. However, in a preferred embodiment of the invention, the longitudinal axis of the retaining arm is not arranged coaxially or parallelly with the rotational axis of the shaft, but rather transversely thereto. This configuration not only provides the advantage that in the fitting position almost all areas of the rim well are visible from above, but also the transverse orientation of the balancer to the retaining arm makes it very simple to pivot the balancer upwardly through 90° from the measuring position to the top position, the centering position. As was explained in the introduction, if the wheel is positioned and centered with the shaft in the vertical position, the incidence of measuring errors is very considerably reduced.

Of course, it is also possible in all cases to provide for pivoting motion of the balancer through a total of 180° when longitudinal axis of the retaining arm is coaxially or parallelly arranged to the rotational axis of the shaft. In this case, the extremity of the retaining arm, on which the balancer is pivotably disposed, is forked, having at least one, but preferably two bearing arms.

The balancer can preferably be stopped in the centering position, the measuring position, and/or the fitting position. The stopping mechanism may be an easily releasable catch, or a positive locking arrangement. The balancer's pivoting motion to the various positions may be effected by means of a cam plate in the manner previously described. The provision of appropriate limit stops also presents no difficulties.

In a particularly simple configuration of the present invention, in addition to the retaining arm, the supporting member is also furnished with a means for securing to a wall. Such a configuration is easily realized because the balancer can ultimately be a unit of very simple, compact construction that may be disposed without difficulty on one end of the retaining arm, while the wall attachment means is provided at the other end of the retaining arm. In this respect, in order to be able to sustain particularly large forces, it is advisable to conform the supporting member with a section designed for securing to a wall that is tangential to the retaining arm. The section for wall attachment may then be furnished with a plurality of securing flanges.

The section for wall attachment arranged perpendicularly to the retaining arm further offers the advantage that it is possible to construct the retaining arm so that it can pivot about the longitudinal axis of the wall attachment section. In this way, the retaining arm can be pivoted from its operating position, which is directed away from the wall, towards the wall so that the space requirement of the balancing device is extremely small.

Of course, instead of the previously described, extremely simple means for securing the balancing device of the invention to a wall, it is also possible to provide for such wherein the balancing device is furnished with a housing or supporting structure (substructure) of the kind previously described, in which the supporting member is housed. Such a device then represents a floor-mounted appliance, as is common in the prior art.

It should also be noted that the capability of pivoting as far as the fitting position described above may also be provided in all cases for a balancing device of the kind described in the introduction.

Preferred embodiments of the invention will be described in detail in the following. The figures show FIG. 1 a perspective view of a part of the balancing device according to the invention with the balancer in retracted position, FIG. 2 a view of the balancing device according to the invention similar to that of FIG. 1, but with the balancer in the centering position, FIG. 3 a view of the balancing device according to the invention similar to that of FIG. 1, but with the balancer in the measuring position, FIG. 4 a view of a further embodiment of the balancing device according to the invention similar to that of FIG. 1, with the balancer in retracted position, FIG. 5 a view of the balancing device similar to that of FIG. 4, but with the balancer in the centering position, FIG. 6 a view of the balancing device similar to that of FIG. 4, but with the balancer in the measuring position, FIG. 7 a top view of a cam plate of the balancing device according to the invention, FIGS. 8 to 12 various diagrammatic representations of the elevating and pivoting motion in a further embodiment of the balancing device according to the invention, FIGS. 13 and 14 top views in diagrammatic representation of a tire-changing device according to the invention, FIG. 15 a perspective view of a further embodiment of a balancer according to the invention.

FIGS. 1 to 6 show two different embodiments of a balancing device 1 that is equipped with a balancer 3 having a shaft 2 for clamping a wheel (not shown). The balancing device 1 has a supporting structure 4 and a bearing surface 5 on top of the supporting structure. It should be noted that the term "supporting structure" is to be interpreted extremely broadly. In this case, it represents a substructure or housing for the balancing device 1, into which the balancer 3 can be lowered. The supporting structure 4 in the present figure is a framework construction made from steel members that are securely connected. In the assembled state, coverings are attached to the individual sides of the balancing device 1.

As can be seen in a comparison of FIGS. 2 and 3 with FIGS. 5 and 6, the balancer 3 can be pivoted 90° with respect to the supporting structure 4 from a horizontal position, described as the measuring position in the following, into a top position, described in the following as the centering position.

Figure 2:
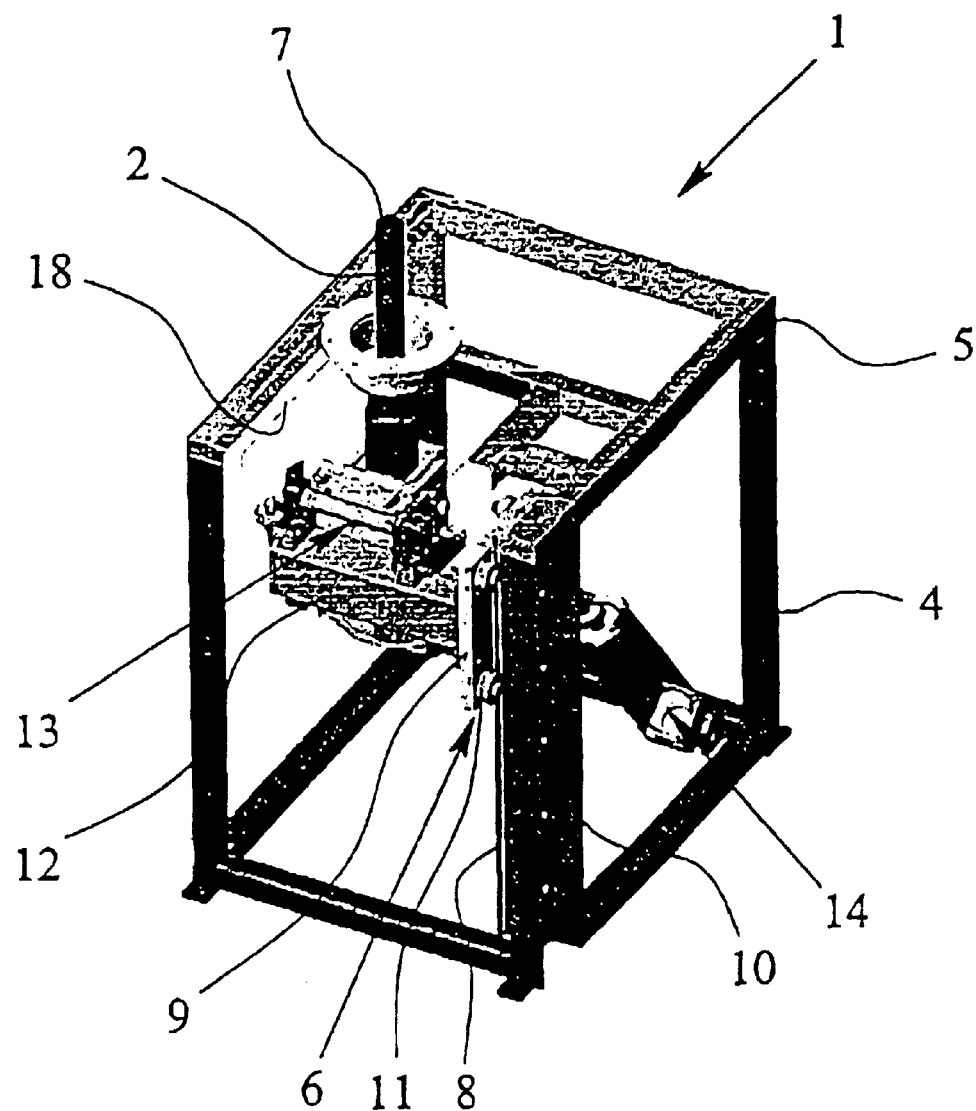
Figure 4:
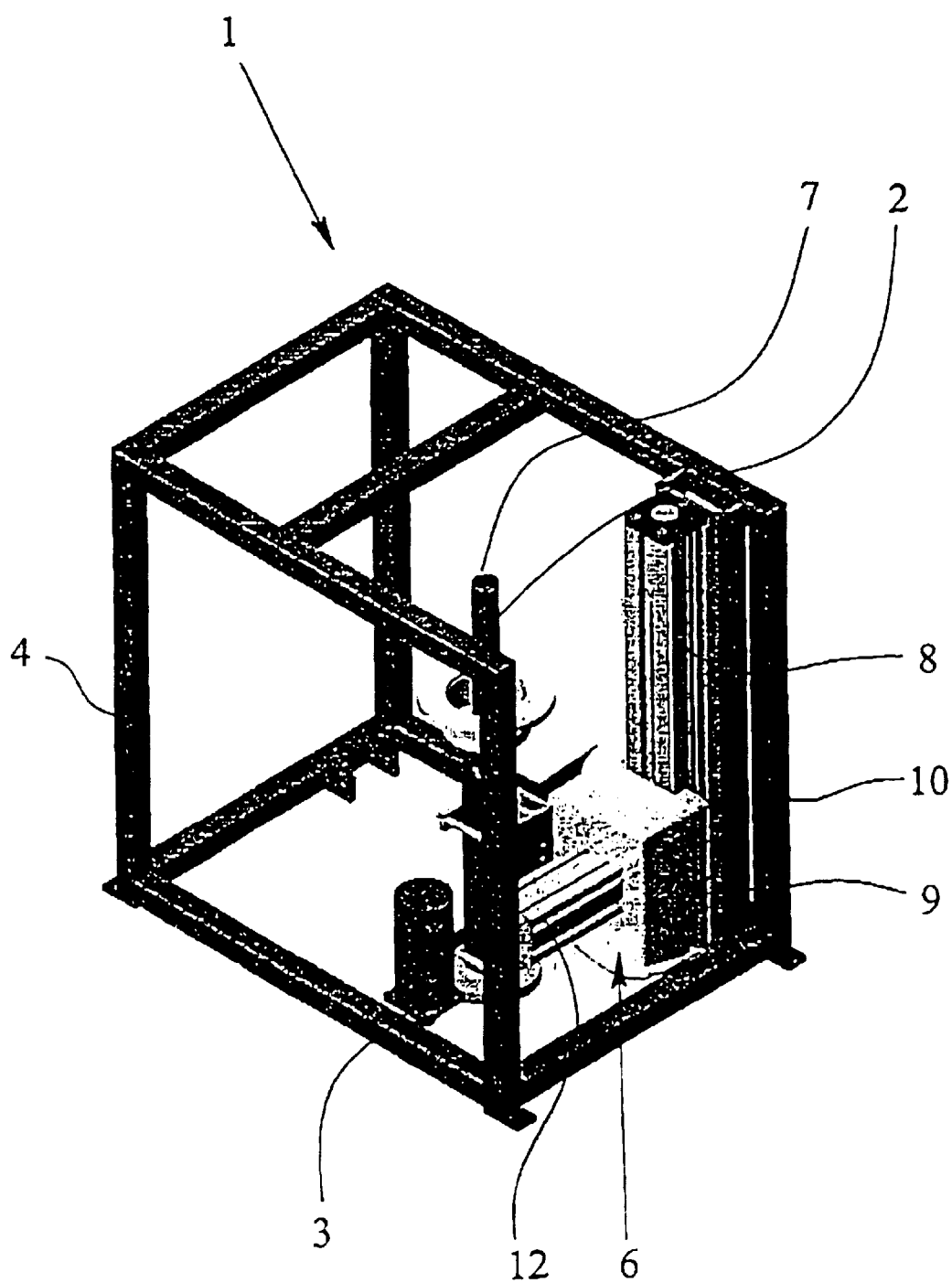
Figure 5:
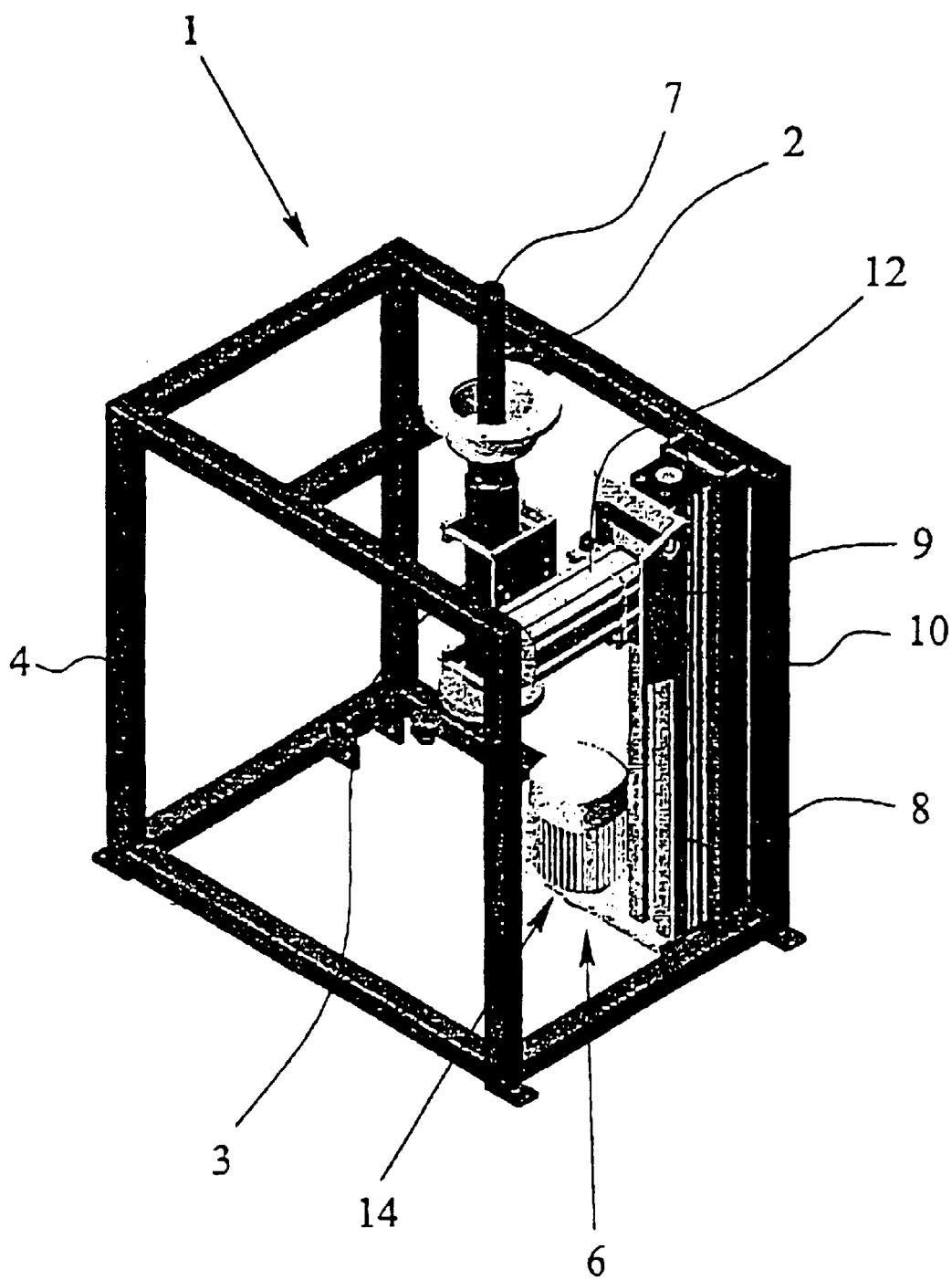

An essential feature is that a height adjustment mechanism 6 is attached to the balancer 3, to lower the balancer 3 into the centering position, as shown in FIGS. 2 and 5, so far into the supporting structure 4 that the distal extremity 7 of the shaft 2 does not project above the bearing surface 5. The lowered or retracted condition with the vertically oriented balancer 3 is shown in FIGS. 1 and 4. As the balancer 3 can be completely retracted with the shaft 2 into the supporting structure 4, it is possible to horizontally reposition a wheel placed on the bearing surface 5 as required.

In the illustrated embodiments, the height adjustment mechanism 6 is furnished with a carriage 9 that is guided by the guide 8, opposite which the balancer 3 is pivotably arranged. The guide 8 is a vertically aligned rail that is secured to the braces 10 of the supporting structure 4, and the carriage 9 moves on rollers 11 that run along the longitudinal sides of the rail-like guide 8. A cross member 12 is secured to the carriage 9, and the balancer 3 is in turn secured to said cross member by means of the swivel bearing 13.

Of course, it is possible in all cases to provide a guide on all opposing sides of the supporting structure. In this event, two carriages are then present, each of which is connected to the cross member.

Figure 3:
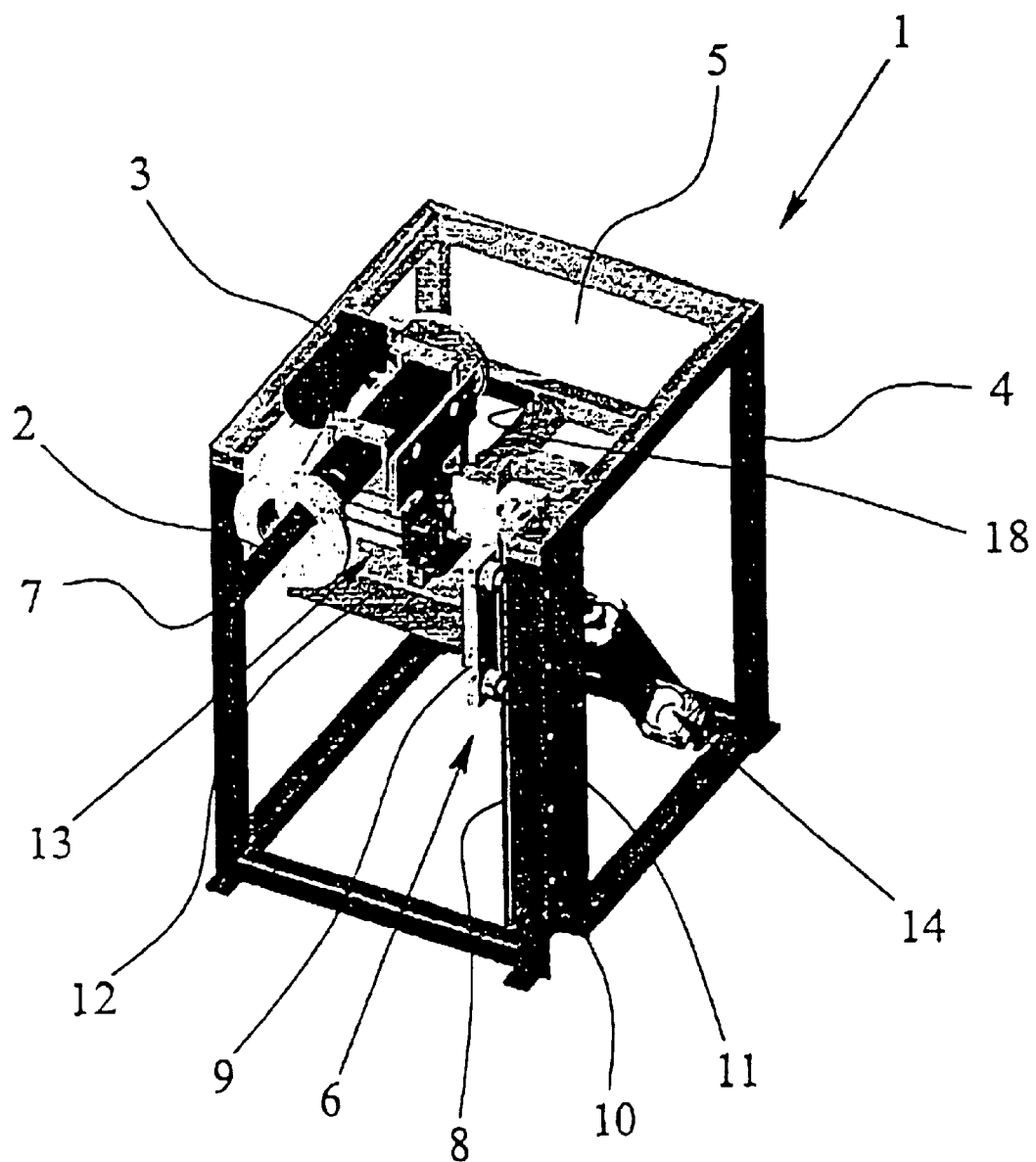
Figure 6:
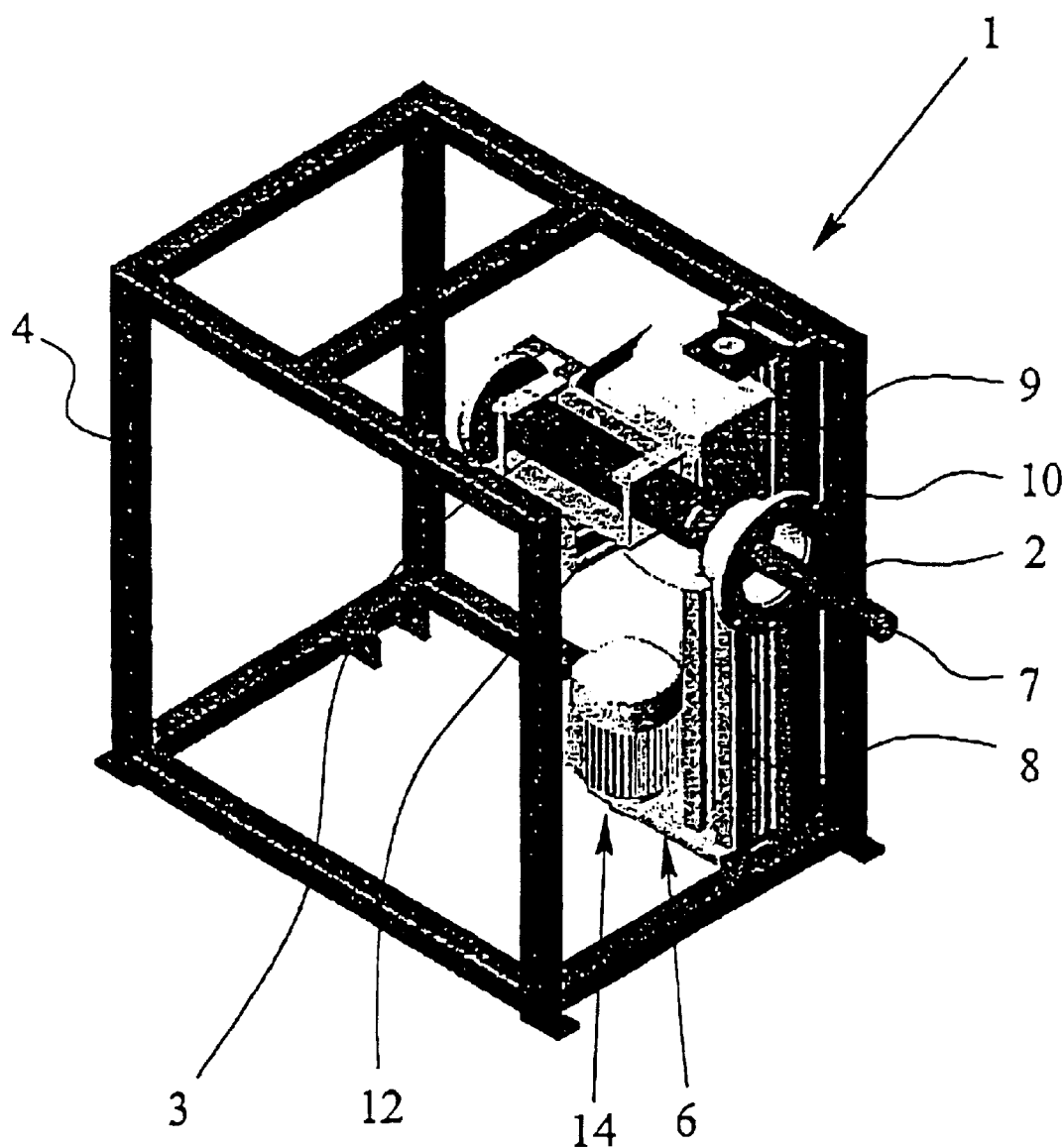

The two embodiments shown in FIGS. 1 to 3 on the one hand and FIGS. 4 to 6 on the other hand differ in that the embodiment represented in FIGS. 1 to 3 is furnished with a height adjustment mechanism 6 having a pneumatic adjusting drive 14 in the form of a pneumatic cam that is connected to the carriage 9 and the cross member 12. The embodiment illustrated in FIGS. 4 to 6 is equipped with an electric adjusting drive 14 that is connected to the carriage 9 by means of a mechanical linkage. The linkage between the electrical adjusting drive 14 and the carriage 9 may be of any kind.

Figure 7:
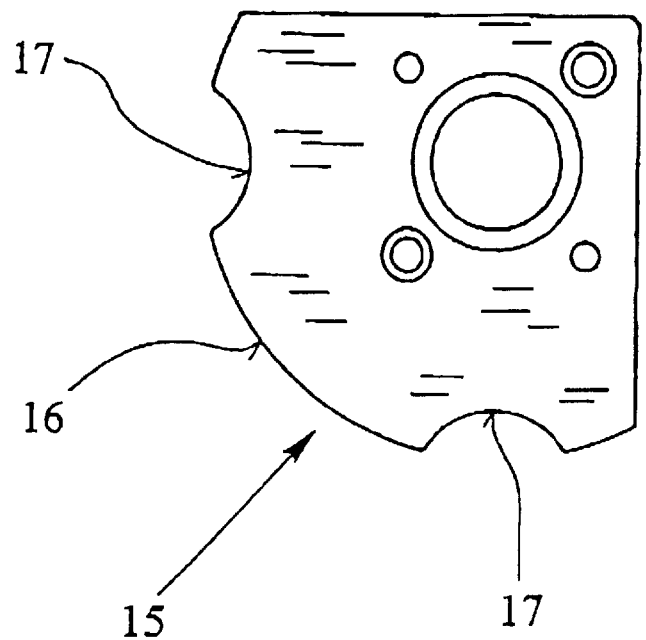

The swivel bearing 13 is equipped with at least one cam plate 15, as illustrated in FIG. 7. A spring-loaded pivot pin (not shown) works in conjunction with the cam plate 15 and runs along the curved edge 16 of the cam plate 15 when the balancer 3 is pivoted. The cam plate 15 is advantageously secured in place to the cross member 12, whereas the spring-loaded pivot pin is secured to the balancer 3. The cam plate 15 is further conformed with recesses 17 on the curved edge 16 that are arranged at a 90° displacement from each other. The recesses 17 serve as locks in the extreme positions, i.e. in the centering position and the measuring position. In the present case, the recesses 17 do not serve as limit stops, though this would be possible without difficulty. Limit stops as such are provided between the balancer 3 and the cross member 12 or the supporting structure, but are not shown. In addition, of course an opening 18 must be provided in the bearing surface 5, as shown in FIGS. 1 to 3 and 8 and 9, so that the balancer 3 can be elevated from its retracted position into the centering position and pivoted from the centering position into the measuring position.

A further embodiment of the adjustment technique of the height adjustment mechanism 6 is illustrated in FIGS. 8 to 12. In this case, the height adjustment mechanism 6 is equipped with an articulated linkage 40 that is connected at one end to the adjusting drive 14 and at the other end to the balancer 3. The characterizing feature of the articulated linkage 40 lies in that it assures both the elevating motion for the balancer 3 and the pivoting motion for the balancer 3. The use of the articulated linkage 40 also means that both directions of motion may be effected with a single adjusting drive 14, for example with just one hydraulic cam, which may represent a considerable savings in terms of cost.

In the present case, the articulated linkage 40 includes an angle lever 41 that is attached at its one end 42 to a pivot pin 43 on the supporting structure 4. A leg 44 is conformed at an angle to the end 42. In the embodiment shown, the leg 44 is conformed at an angle of roughly 45° with respect to the main leg of the angle lever 41. At its extremity, the leg 44 is connected to the adjusting drive 14. At its other end 45, the angle lever 41 is jointedly connected with a further lever 46, which in turn is jointedly connected at its other end with the balancer 3. The balancer 3 itself engages with a guide tongue 47 in a pivotable guide rail 48. The guide rail 48 is pivotably attached at its upper extremity 49.

Figure 8:
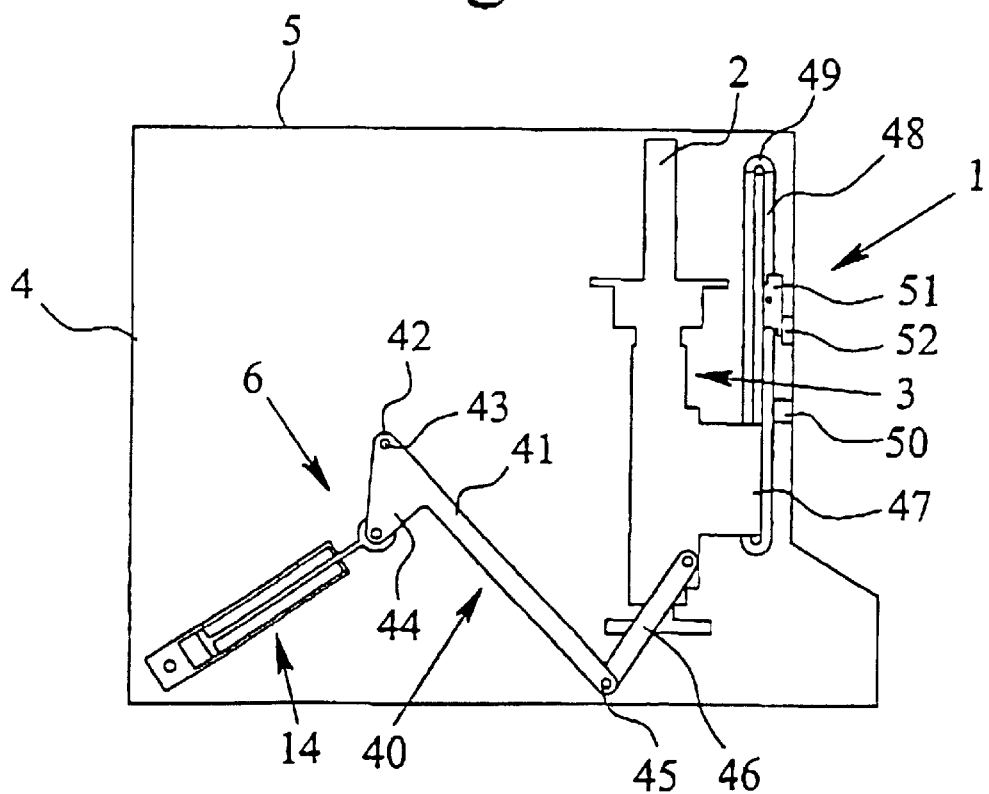

In the position shown in FIG. 8, with the balancer 3 fully retracted, the guide rail 48 is aligned vertically. In this position, it abuts with a limit stop 50 provided in the supporting structure 4. The guide rail 48 is furnished with a detent pawl 51, which serves to prevent the balancer 3 from "backslip", as will be explained in detail in the following. The detent pawl 51 is under spring tension and in the position shown in FIG. 8 works in conjunction with a further limit stop 52 in such a manner that the guide slot in the guide rail 48 is released to allow the guide tongue 47 to move along the guide slot in the guide rail 48.

Figure 9:
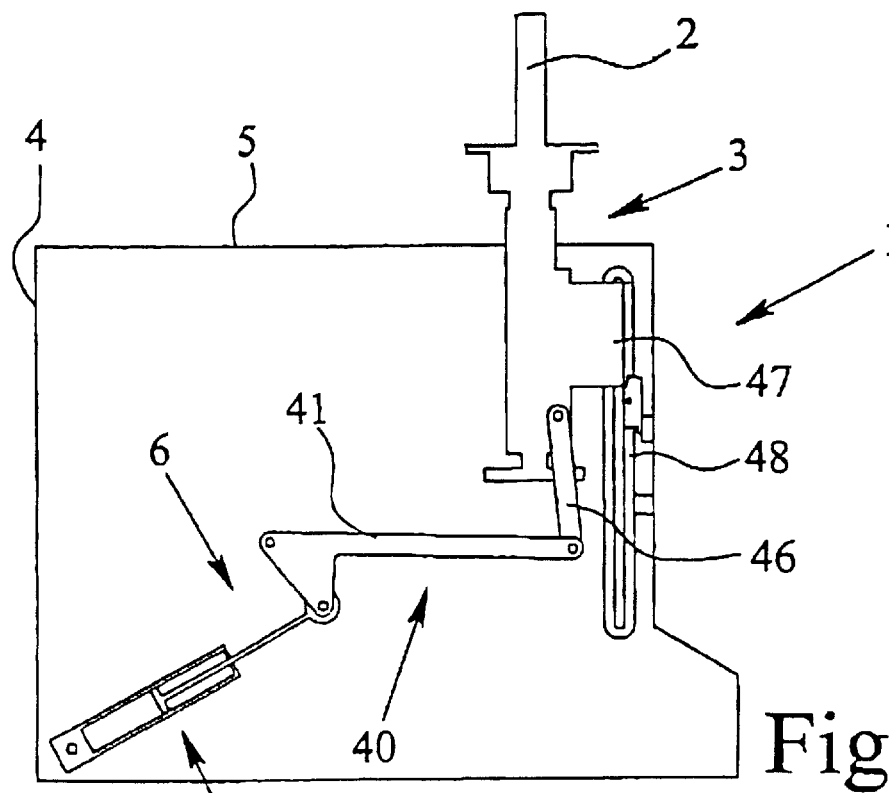
Figure 10:
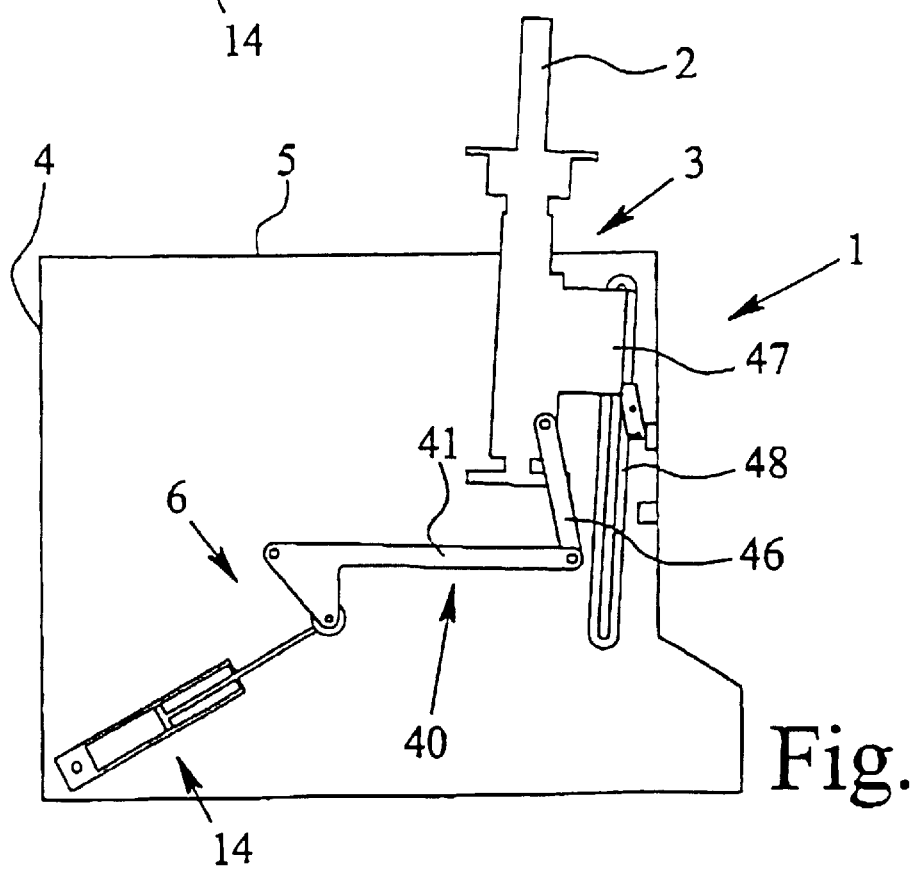
Figure 11:
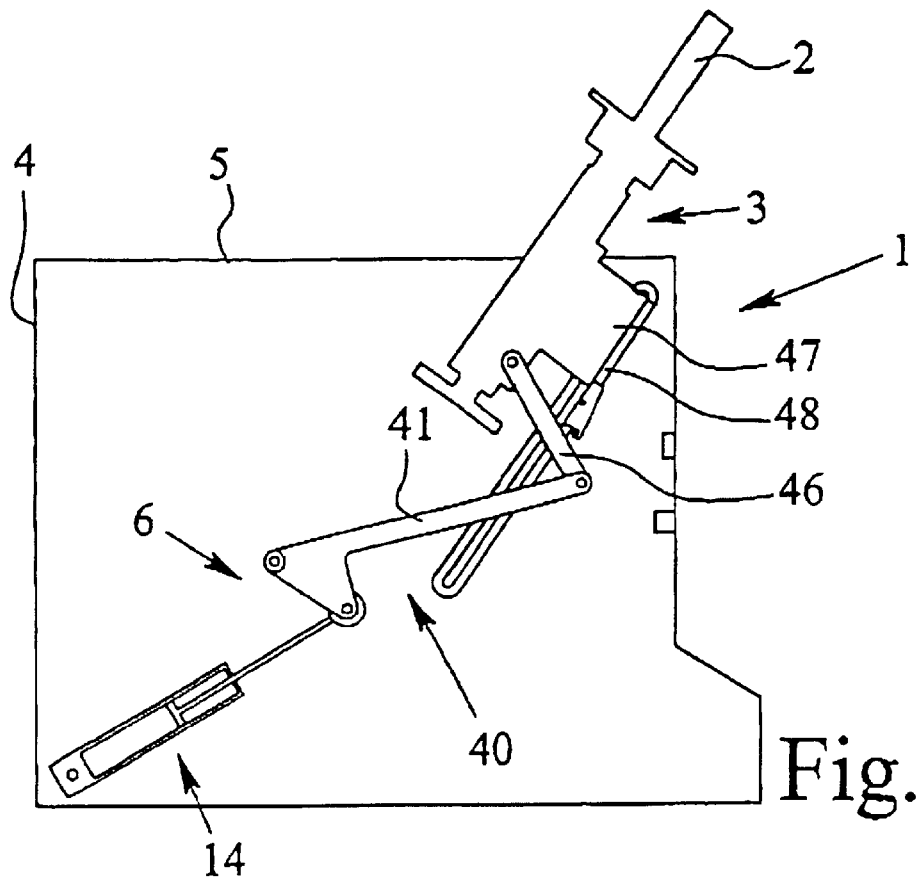
Figure 12:
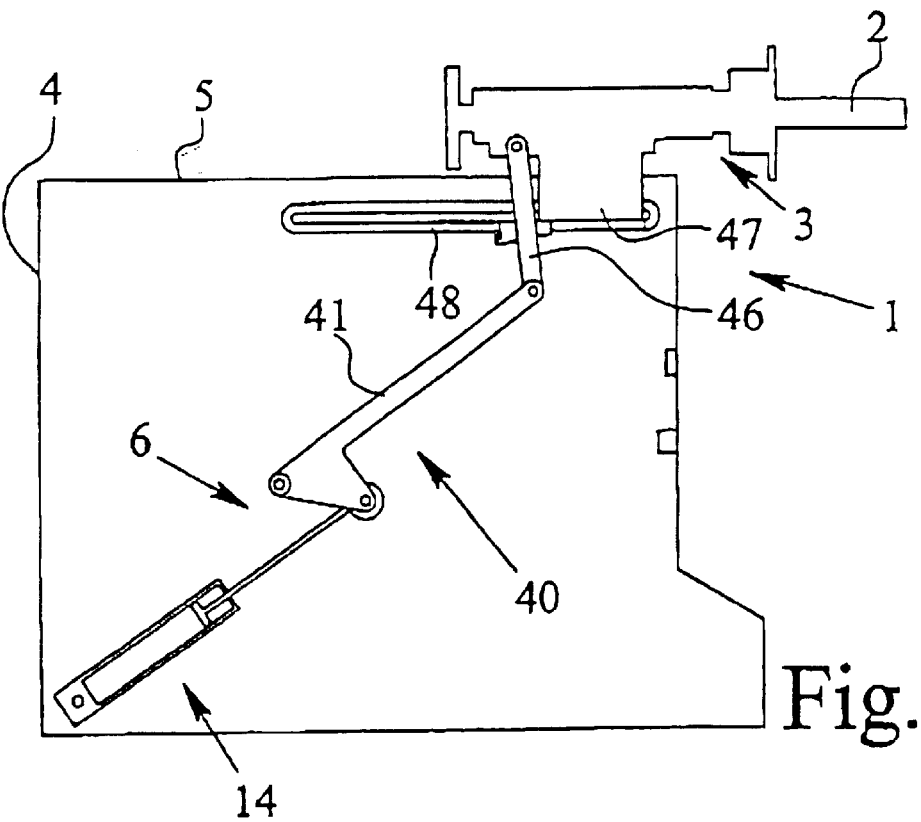

To assure the elevating motion of the balancer 3, starting from the position shown in FIG. 8, the adjusting drive 14 is actuated. The angle lever 41 then pivots from the lowered position shown in FIG. 8 around the pivot pin 43 into a roughly horizontal position, as shown in FIG. 9. The articulated connection with the lever 46 thus causes the balancer 3 to be displaced over the guide tongue 47 that is engaged with the guide rail 48 as far as the upper extremity 49 of the guide rail 48. The maximum extension, with the balancer 3 at its fully elevated position, is shown in FIG. 9. In this position, the guide rail 48 still abuts with the limit stop 50, while the detent pawl 51 still functions in conjunction with the additional limit stop 52. If the angle lever 41 is pivoted further, in counterclockwise direction, the guide rail 48 begins to pivot in clockwise direction about the pivot point at its upper extremity 49. This causes the guide rail 48 to move away from the limit stop 50. At the same time, the detent pawl 51 disengages from the additional limit stop 52. The spring-loaded detent pawl 51 then engages with a corresponding locking recess in the guide slot of the guide rail 48 and secures the balancer in the topmost position of the guide rail 48. This position is shown in FIG. 10. Further operation of the adjusting drive 14 causes the balancer 3 to pivot from an intermediate position into the measuring position, as illustrated in FIGS. 11 and 12. The balancer 3 is pivoted back from the measuring position shown in FIG. 12 to the retracted position shown in FIG. 8 in the same manner as described above, but in the reverse order.

Figure 13:
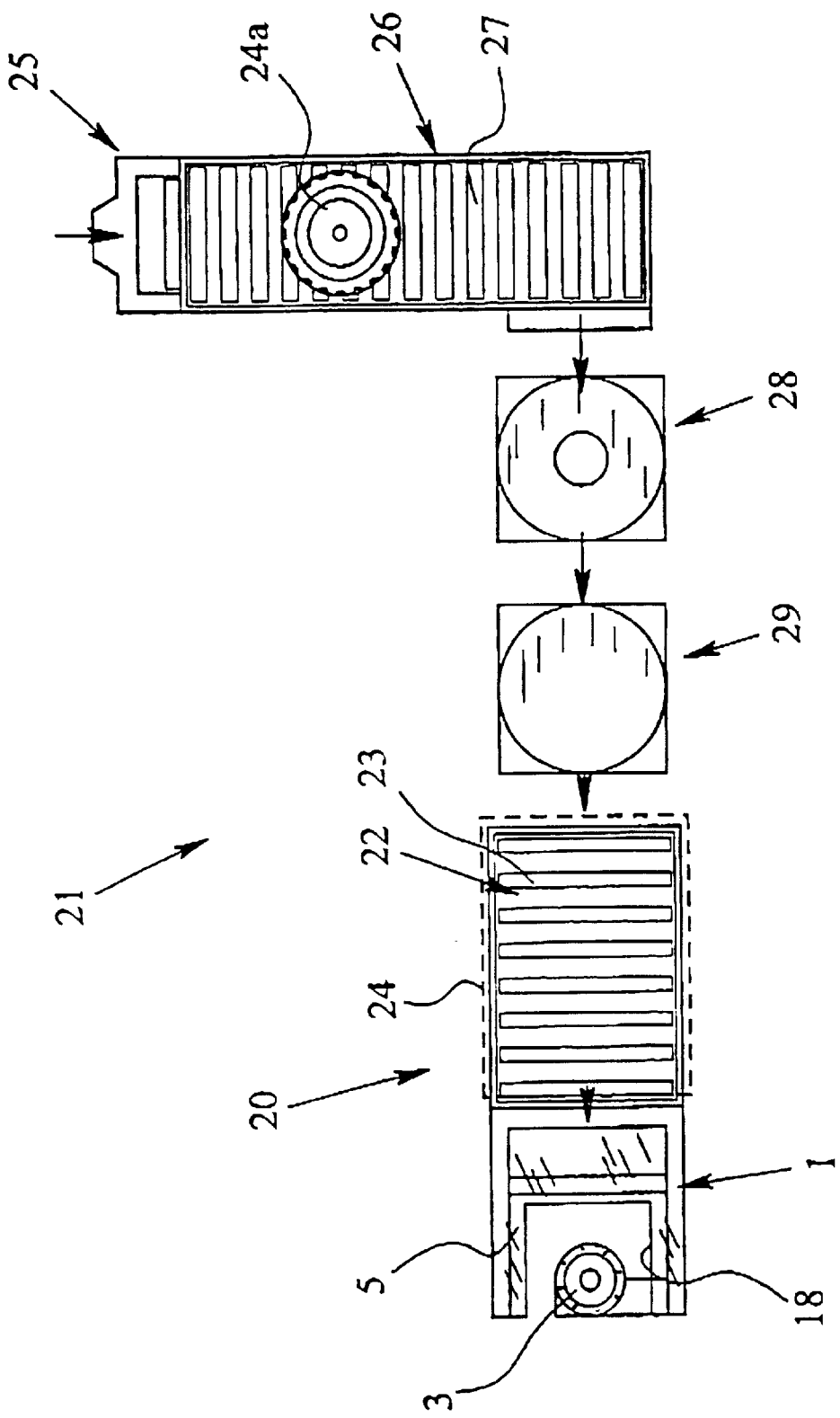
Figure 14:
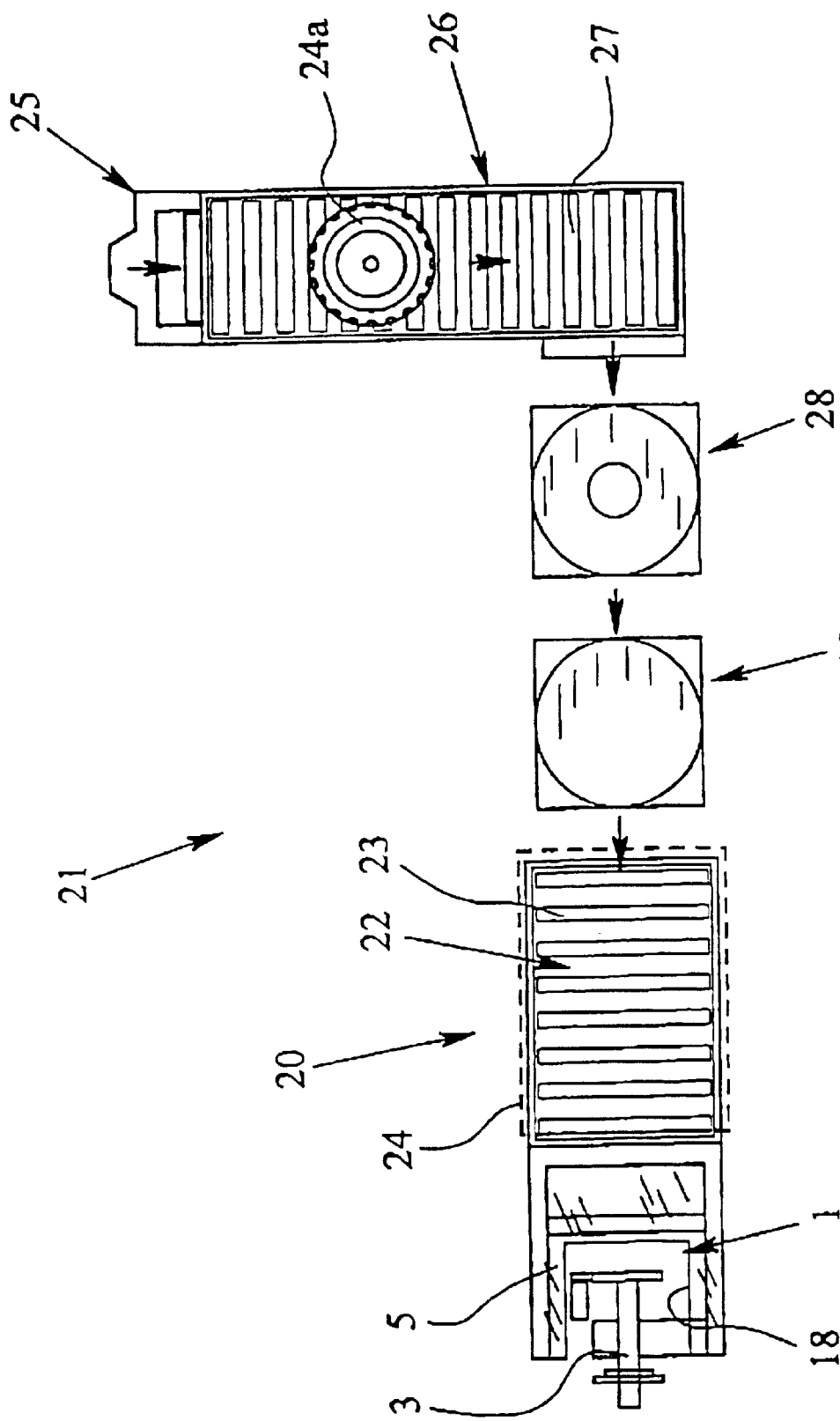

FIGS. 13 and 14 show a balancing and inflation station 20 that constitutes part of the tire-changing equipment 21 according to the invention. The balancing and inflation station 21 includes a balancing device 1 of the kind previously described. The balancing and inflation station is further equipped with an arrangement for supplying air (not shown) and an inflation bench. The inflation bench 22 is furnished with a plurality of rollers 23. A safety cage 24 is also provided on and above the inflation bench 22. The inflation bench 22 leads directly to the bearing surface 5, which may also be configured with rollers. In addition, the substructure of the inflation bench 22 is constructed integrally with supporting structure 4 of the balancing device 1. As a result of the direct contiguity of the inflation bench 22 and the bearing surface 5, it is very easy to move a wheel 24*a*, as shown in FIGS. 13 and 14, from the inflation bench 22 onto the bearing surface 5 without having to lift the wheel.

In all cases, it is also possible to dispose the balancing device directly below the inflation bench, so that the wheel can be clamped to the shaft immediately upon inflation, without having to move the wheel.

FIG. 13 illustrates the balancing and inflation station 20 in a position such that the balancer 3 is in the retracted or centering position. In FIG. 14, the balancer 3 has been moved to the horizontal measuring position.

Moreover, FIGS. 13 and 14 show the tire-changing equipment and its individual components, including, in the direction of the arrows indicating the operating flow, a tire elevator adjacent to which a storage bench 26 with rollers 27 is furnished. A bead breaker 28 is located beside the storage bench 26, followed by a tire-changing device. The previously described balancing and inflation station 20 is located thereafter.

The tire on the wheel 24*a* is changed in such a manner that the wheel 24*a* is transported by means of the wheel elevator 25 and then the storage bench 26 first to the bead breaker 28, where the rim bead is separated. A new tire is fitted on the tire-changing equipment 29, and when the wheel with the new tire has been transferred to the inflation bench 22 of the balancing and inflation station 20; the new tire is inflated to a prescribed overpressure. This overpressure is then vented to achieve the desired final pressure. When the wheel is pushed from the inflation bench 22 to the bearing surface 5, it is moved directly to the balancing device 1, without having to be rotated or lifted again. In this condition, the wheel rests on the bearing surface 5 with the rim well facing downwards. The balancer 3 is then elevated from its lowered position, and the wheel is repositioned accordingly so that the shaft protrudes into the corresponding rim opening of the wheel. The wheel is then clamped to the shaft 2 in the centering position and pivoted into the measuring position illustrated in FIG. 9. Measurement can then begin.

Figure 15:
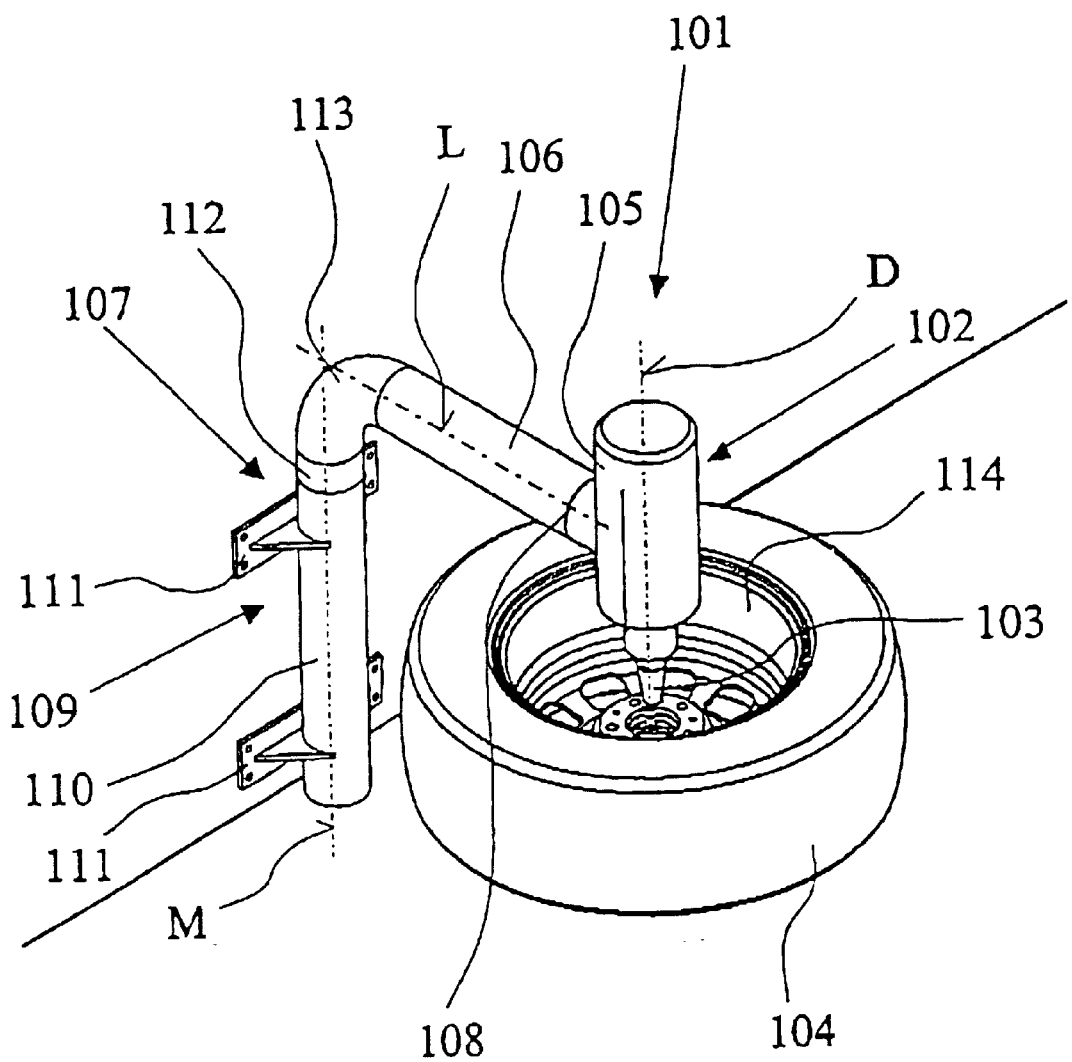

FIG. 15 shows a perspective view of a further embodiment of a balancing device 101 according to the invention. The balancing device 101 includes a balancer 102 with a shaft 103 for clamping a wheel 104. In the illustrated embodiment, balancer 102 is a compact unit that is contained in a housing 105. Indicator means may be provided on balancer 102 to display the size or value and the position of the calculated balancer weight. On the other hand, a separate display unit, such as a monitor, may also be provided for this purpose. This is not shown, however.

The characteristic feature of this embodiment is that the balancer 102 is pivotably attached to a retaining arm 106 of a supporting member 107 in such manner that the balancer 102 may be pivoted 90° from a horizontal position (not shown), which will hereinafter be described as the measuring position, to a lower position, which will hereinafter be described as the fitting position and in which the shaft 103 is oriented directly downwards. In the illustrated embodiment, the longitudinal axis L of the retaining arm 106 is aligned transversely to the rotational axis D of the shaft 103. Additionally, the balancer 102 is also attached to the retaining arm 106 in such a manner that it can also be pivoted 90° upward from the measuring position into an upper position, which will be described hereinafter as the centering position. In the centering position, the shaft 103 is oriented directly upwards, so that the wheel 4 may be easily placed on the shaft 103 from above.

According to the construction, the swivel bearing is disposed in such a manner between the balancer 102 and the retaining arm 106 that an articulation (not further shown) is provided at the point 108 where the retaining arm 106 and the balancer 102 join, so that the balancer may be pivoted at least 180°. It is also possible to provide means to allow the balancer to pivot 360° about the longitudinal axis of the retaining arm, with the final effect that the balancer 102 may swivel in either direction.

Also not shown in the area of the point 108 where the balancer 102 and the retaining arm 106 join are the braking means provided to ensure that the balancer can be stopped in the individual positions, that is to say, the centering position and the fitting position.

In the embodiment shown, the supporting member 107 is furnished with a means for attaching to a wall. For this purpose, a section 110 designed for securing to a wall is arranged perpendicularly to the retaining arm 106. In the illustrated embodiment, this means includes two flanges 111 which can be screwed to a wall. The retaining arm 106 may be pivoted about the longitudinal axis M of the section 110 for securing to a wall, so that it may be pivoted from the illustrated position, wherein it is oriented away from the wall, towards the wall on one side or the other. A joint 112 is provided for this purpose adjacent to the section 110 designed for securing to a wall, to which joint a connecting member 113 is also connected and is in turn connected to the retaining arm 106. In all cases, the connecting member 113 may also be constructed as a single unit with the retaining arm 106. In the area of the joint 112 also, braking means may be provided to ensure that the retaining arm is locked in the respectively required position.

In order to place the wheel 104 on the balancer 102, the balancer is first pivoted 180° from the illustrated position, so that the shaft 103 is pointing upwards. The wheel 104 is then placed on top of said balancer with the rim well 114 facing downward. When the wheel 104 has been centered and clamped on the shaft 103, the balancer is pivoted 90° into the measuring position. The measuring operation can then begin. When the measuring cycle is complete, the balancer 102 is pivoted downwards through 90° into the fitting position, in which the shaft points directly downwards. The rim well of the wheel, which is secured to the shaft 103, is now facing upwards, so that the balancer weight can be attached very easily at the determined and possibly (directly in the rim well) displayed balancing position. When the adhesive weight has been applied, the balancer may be returned to the measuring or the centering position as required so that the clamps may be released and the wheel may be removed from the balancer 102.

What is claimed is:

1. A balancing device comprising:
    a balancer equipped with a shaft for clamping a wheel;
    a supporting structure coupled to the balancer;
    a bearing surface on top of the supporting structure, wherein the balancer may be pivoted 90° with respect to the supporting structure from a lower measuring position into an upper centering position; and
    a height adjustment mechanism coupled to the supporting structure to lower the balancer in the centering position so far into the supporting structure that a distal extremity of the shaft does not project above the bearing surface.

2. A balancing device according to claim 1, further comprising a guide coupled to the supporting structure wherein the height adjustment mechanism includes an adjusting drive and at least one carriage guided on the guide, opposite which the balancer is pivotably attached.

3. A balancing device according to claim 2, further comprising at least one additional guide coupled to the supporting structure and at least one additional carriage coupled to the at least one additional guide, and a cross member coupled to the at least one carriage and the at least one additional carriage, wherein the height adjustment mechanism is disposed on respective opposing sides of the balancer, and wherein the balancer is disposed on the cross member between the carriages.

4. A balancing device according to claim 1, further comprising a cam plate and a spring loaded pivot pin coupling the cam plate to the supporting structure, wherein the pivoting of the balancer is effected by means of the cam plate and the spring-loaded pivot pin acting on the cam plate, wherein the cam plate has recesses at extreme positions and also contains limit stops that restrict rotational travel of the cam plate.

5. A balancing device according to claim 1, wherein the balancer further comprises braking means to slow the pivoting motion, and wherein the braking means have the form of double-acting cams.

6. A balancing device according to claim 1, wherein the height adjustment mechanism has an articulated linkage that is pivotably housed in the supporting structure, and attached at one end to the balancer, which when actuated, assures both the elevating motion and the pivoting motion for the balancer.

7. The balancing device as in claim 1, further comprising a means for supply of air and an inflation bench, wherein the inflation bench forms part of the bearing surface and wherein the balancing device now forms a balancing and inflation station.

8. The balancing device as in claim 7, further comprising a safety cage disposed above the inflation bench, wherein the safety cage is removably attached to the inflation bench.

9. The device as in claim 7, further comprising a bead breaking mechanism a tire-changing device, and a balancing and inflation station.

10. A method for inflating and balancing a wheel, comprising the following steps:
    placing a wheel on an inflation bench of a balancing and inflation station with a rim well of the wheel facing downwards;
    inflating a tire of the wheel with air at a preset pressure on the inflation bench;
    clamping the wheel on the inflation bench to a shaft of a balancer of the balancing and inflation station;
    elevating the shaft with the balancer from a fully retracted position upwards into centering position;
    pivoting the balancer through 90° into a horizontal measuring position together with the wheel that is clamped to the shaft for the performance of an unbalanced mass measurement cycle.

11. The balancing device, as in claim 1, further comprising:
    a retaining arm wherein the balancer is pivotably attached to retaining arm; and a supporting member for supporting the retaining arm in such a manner that the balancer may be pivoted 90° from a horizontal measuring position to a lower fitting position.

12. The balancing device according to claim 11, wherein a longitudinal axis (L) of the retaining arm is aligned transversely to a rotational axis (D) of the shaft.

13. A balancing device according to claim 11, wherein the balancer is pivotably attached to the retaining arm so that the balancer may be pivoted 90° from the measuring position to an upper centering position.

14. A balancing device according to claim 1, wherein the balancer may be stopped, and particularly locked, in different positions including the centering position, the measuring position and or the fitting position.

15. A balancing device according to claim 1, wherein the supporting structure has a means for attaching to a wall that is disposed perpendicular to the retaining arm, and wherein the retaining arm may preferably be pivoted about the longitudinal axis (L) of the section for securing to a wall.

16. a balancing device according to claim 1, wherein the supporting structure is disposed in a floor-mounted housing.

* * * * *